United States Patent [19]
Gabber et al.

[11] Patent Number: 5,961,593
[45] Date of Patent: *Oct. 5, 1999

[54] SYSTEM AND METHOD FOR PROVIDING ANONYMOUS PERSONALIZED BROWSING BY A PROXY SYSTEM IN A NETWORK

[75] Inventors: Eran Gabber, Summit; Phillip P. Gibbons, Westfield, both of N.J.; Yossi Matias, Potomac, Md.; Alain J. Mayer, New York, N.Y.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,557

[22] Filed: Jan. 22, 1997

[51] Int. Cl.[6] .............................. G06F 13/14; H04L 9/32
[52] U.S. Cl. ...................... 709/219; 709/225; 710/36; 370/85.13; 370/329; 380/25; 380/49
[58] Field of Search ........................ 380/25, 49; 370/329, 370/85.13; 710/1, 36; 709/225, 219; 395/200.16, 200.3, 200.57

[56] References Cited

U.S. PATENT DOCUMENTS

| 5,550,984 | 8/1996 | Gelb | 395/200.17 |
| 5,673,322 | 9/1997 | Pepe et al. | 380/49 |
| 5,729,537 | 3/1998 | Billstrom | 370/329 |
| 5,742,762 | 4/1998 | Scholl et al. | 395/200.3 |
| 5,768,391 | 6/1998 | Ichikawa | 380/49 |

FOREIGN PATENT DOCUMENTS

PCT 97/15885   5/1997   WIPO ............................ G06F 13/00

OTHER PUBLICATIONS

Article entitled "Security Without Identification: Transaction Systems to Make Big Brother Obsolete" by David Chaum, from Communications of the ACM, Oct. 1985, pp. 1030–1044.

Article entitled "Privacy–Enhancing Technologies for the Internet" by Ian Goldberg, David Wagner and Eric Brewer of the University of California, Berkeley.

Article entitled "NetBill Security and Transaction Protocol" by Benjamin Cox. J.D. Tygar and Marvin Sirbu of Carnagie Mellon University.

Article entitled "How to Construct Random Functions" from the Journal of the Association for Computing Machinery, by Oded Goldreich, Shafi Goldwasser and Silvio Micali, Oct. 1986, pp. 792–807.

Article entitled "Proceedings Symposium on Network and Distributed System Security" by the IEEE Computer Society Press: Feb. 22–23, 1996; pp. 1–16.

Article entitled "Anonymous Connections and Onion Routing" 1997 IEEE Symposium on Security and Privacy; by Paul F. Syverson, David M. Goldschlag and Michael G. Reed, Naval Research Library, pp. 1–11.

(List continued on next page.)

*Primary Examiner*—Thomas C. Lee
*Assistant Examiner*—Rehana Perveen

[57] ABSTRACT

For use with a network having server sites capable of being browsed by users based on identifiers received into the server sites and personal to the users, alternative proxy systems for providing substitute identifiers to the server sites that allow the users to browse the server sites anonymously via the proxy system. A central proxy system includes computer-executable routines that process site-specific substitute identifiers constructed from data specific to the users, that transmits the substitute identifiers to the server sites, that retransmits browsing commands received from the users to the server sites, and that removes portions of the browsing commands that would identify the users to the server sites. The foregoing functionality is performed consistently by the central proxy system during subsequent visits to a given server site as the same site specific substitute identifiers are reused. Consistent use of the site specific substitute identifiers enables the server site to recognize a returning user and, possibly, provide personalized service.

55 Claims, 6 Drawing Sheets

OTHER PUBLICATIONS

Article entitled "Frequently Asked Questions about Mixmaster Remailers" FAB Verson 1.8, Jul. 4, 1996 by Lance Cottrell.

"How to Make Personalized Web Browsing Simple, Secure, and Anonymous" by Eran Gabber, Phillip B. Gibbons, Yossi Matias, Alain Mayer; pp. 17–31; Feb. 1997.

"How to be Virtually Anonymous" by Randal L. Schwartz; Feb. 1997; pp. 30–33.

"Private Web Browsing " by Paul F. Syverson, Michael G. Reed, David M. Goldschlag; 1997; pp. 237–248.

"Anonymous Connections and Onion Routing " by Paul F. Syverson, David M. Goldschlag and Michael G. Reed; May 1997; pp. 44–54.

SYSTEM AND METHOD FOR PROVIDING ANONYMOUS PERSONALIZED BROWSING BY A PROXY SYSTEM IN A NETWORK

TECHNICAL FIELD OF THE INVENTION

The present invention is directed, in general, to networks and, more specifically, to a system and method that allows a user to browse personalized server resources on a network anonymously.

BACKGROUND OF THE INVENTION

The Internet is a well-known collection of networks (e.g., public and private data communication and multimedia networks) that work together (cooperate) using common protocols to form a world wide network of networks.

In recent years, the availability of more efficient, reliable and cost-effective computers and networking tools have allowed many companies and individuals (collectively, "users") to become involved in an ever growing electronic marketplace. The immeasurable gains in technology experienced by the computer industry overall have allowed these users to rely on commercially available computers, such as personal computers ("PCS"), to meet their information processing and communication needs. To that end, PC manufacturers equip most PCS with an interface that may be used for communication over networks, such as the Internet.

The Internet continues to increase its position as an integral place for businesses that offers information and services to potential customers. Popular examples of such businesses are news providers (e.g., www.cnn.com (the Cable News Network), www.nytimes.com (the New York Times), www.wsj.com (the Wall Street Journal), www.ft.com (Financial Times Magazine), www.businessweek.com (Business Week Magazine)); car manufacturers (e.g., www.ford.com/us (the Ford Motor Company), www.gm.com (the General Motor Company), www.toyota.com (the Toyota Motor Company)); book stores (e.g., www.amazon.com (Amazon.com books)); software providers (e.g., www.microsoft.com (the Microsoft software company)) and many more.

Most often, such a business sets up a home page on the World Wide Web (a "web-site," the World wide Web is a logical overlay of the Internet). The web-site constitutes an electronically-addressable location that may be used for promoting, advertising and conducting business. Potential electronic customers use web-browsers (e.g., NETSCAPE NAVIGATOR®, MICROSOFT EXPLORER®, etc.) to access the information offered on those web-sites.

An increasing number of web sites offer personalized services that may include "personalized web pages" customized to a user's interests, with hyper-links (a reference or link from some point in one hypertext document to some point in another document or another place in the same document—often displayed in some distinguishing way (e.g., in a different color, font or style)) and displayed messages tailored according to the user's preferences. Such preferences can be ascertained by having a user establish an account with that web-site. This allows the web-site to store information about the user's previous visits, either by tracking the hyper-links the user followed or through explicit dialogs with the user. For example, the Wall Street Journal provides a "personalized journal" to each user, where the sequence and selection of sections is customized. In order to open an account, the user typically has to complete a form electronically, providing a user name, a password, an electronic-mail ("e-mail") address, etc. The latter is often used by the web-site to send back information not provided on the web-site itself to the user.

Given the inherent lack of privacy of electronic communication over the Internet generally, and, particularly, the World Wide Web, it has long been felt that a system that could ensure private electronic communication would be highly advantageous. As an example of the problem, consider the plight of a customer that would like to browse the World Wide Web in a safe and private (anonymous) manner, visiting sites that provide personalized service. The customer would like to establish accounts on web-sites without revealing his true identity, and without reusing the same user names, passwords, for multiple sites. Customers should refrain from reusing the same user names and passwords at multiple sites to avoid a security breach at one site to affect other sites; additionally refraining from using such user names and passwords limits the ability of multiple sites from colluding to combine customer information and build dossiers on particular customers.

Typically, the customer visits many of these web-sites, and inventing and remembering new user names and passwords for each web-site becomes tedious. Moreover, many of these web-sites require the customer to include his e-mail address with his user name and password—by providing his e-mail address, the customer reveals his identity.

In addition, there are commercial products available that allow web-sites to track their clients and visitors. Such tracking can be made even when no voluntary information is provided by the user and no form is filled out. Examples of such systems are "Webreporter," which is available from OPENMARKET, INC., and "SiteTrack," which is available from GROUP CORTEX, whose advertisement reads as follows:

"Identify who is visiting your site. Record the actual number of people that visit. Find which links they follow and trace their complete path. Learn which site users came from and which site they depart to . . . "

These products are made possible because the hypertext transport protocol ("HTTP-protocol"), on which the World Wide Web is largely based, allows specific information to flow back from the user to the web-site. This can include for example, the user's e-mail address, the last web-site he came from, and information about the user's software and host-computer. Other pertinent user information may be sent by the web-site to the user browser using what are commonly referred to as "cookies" (pieces of information that web-sites may store at the user's browser). On subsequent visits to the web-site, the user's browser sends back information to the web-site without the user's knowledge.

From the foregoing, it is apparent that what is needed in the art is a scheme that provides anonymous personalized web browsing that satisfies two seemingly conflicting objectives, namely, providing user privacy and user identification.

SUMMARY OF THE INVENTION

To address the above-discussed deficiencies of the prior art, the present invention introduces a proxy system that performs two basic functions: (1) automatic substitution of user-specific identifiers such that server sites (e.g., web sites, junction points, intelligent portal devices, routers, network servers, etc.) within a network are prevented from determining the true identity of the user browsing (accessing, locating, retrieving, reading, contacting, etc.) the sites; and (2) automatic stripping of any other information associated with browsing commands that would allow the server sites to determine the true identity of the user browsing the server sites. An important aspect of the present invention is that the foregoing functions are performed consistently by the proxy system during subsequent visits to the server site (the same substitute identifiers are used on repeat visits to the server site; the server site also cannot distinguish between information supplied by the user and the proxy system, thus the proxy system is transparent to the server site). The present invention therefore not only introduces anonymous browsing, but also personalization based upon the consistent use of substitute identifiers.

It should be noted that the term "true," as used herein, means accurate, actual, authentic, at least partially correct, genuine, real or the like, the term "or," as used herein, is inclusive, meaning and/or; and the phrase "associated with" and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like.

As is described in greater detail hereinbelow, the principles of the present invention address the conflicting objectives of user privacy and user identification described hereinabove by providing a proxy system, a peripheral proxy system, and a method of providing substitute identifiers to a server site that allow users to browse the same anonymously via the proxy system.

In one embodiment, the present invention provides, for use with a network having server sites capable of being browsed by users based on identifiers received into the server sites and personal to the users, a central proxy system for providing substitute identifiers to the server sites that allow the users to browse the server sites anonymously via the central proxy system. According to various embodiments of the present invention, the substitute identifiers may be suitably constructed by the user site or a routine associated with the central site (advantageous ways (functions) of constructing the substitute identifiers are described hereinafter). The exemplary central proxy system includes: (1) a computer-executable first routine that processes (receives, accepts, obtains, constructs, produces, etc.) site-specific substitute identifiers constructed from data specific to the users, (2) a computer-executable second routine that transmits substitute identifiers to the server sites and thereafter retransmits browsing commands received from the users to the server sites and (3) a computer-executable third routine that removes (and possibly substitutes) portions of the browsing commands that would identify the users to the server sites. "Include" and derivatives thereof, as used herein, means inclusion without limitation.

In one embodiment, the first of the two above-enumerated basic functions is performed external to the central proxy system, while in another it is performed, at least in part, within the central proxy system. The central proxy system processes and forwards the substitute identifiers as appropriate and directly performs the second of the above-enumerated basic functions by stripping other information that would tend to identify the users. An Internet Access Provider ("ISP"), such as NETCOM®, or a networking service, such as AMERICA ONLINE® or COMPUSERVE® can advantageously employ the central proxy system to provide anonymous retransmission of browsing commands by their users.

It is important to understand that subsequent use of the proxy system by a "same" user to a "same" server site will cause the proxy system to construct (directly or indirectly) and use the same (site-specific) substitute identifiers. Typically, the proxy system functions as a conduit communicating messages between the user and the server. Depending upon the embodiment, the proxy system may remove or substitute some portion of messages communicated by the user to the server to ensure anonymity.

An alternative advantageous embodiment of the present invention may be provided in the form of a peripheral proxy system designed for use with a network having a server site capable of being browsed by users based on identifiers received into the server site and personal to the users. The peripheral proxy system includes: (1) a computer-executable first routine that constructs a particular substitute identifier from data received from a particular user and (2) a computer-executable second routine that transmits the particular substitute identifier to the central proxy system, the central proxy system retransmitting the particular substitute identifier to the server site and thereafter retransmitting browsing commands received from the particular user to the server site. According to this embodiment, the first routine may be associated, at least in part, with the user site, which distributes the basic functions of the present invention over multiple computer systems.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, wherein like numbers designate like objects, and in which.

DETAILED DESCRIPTION

Figure 1:
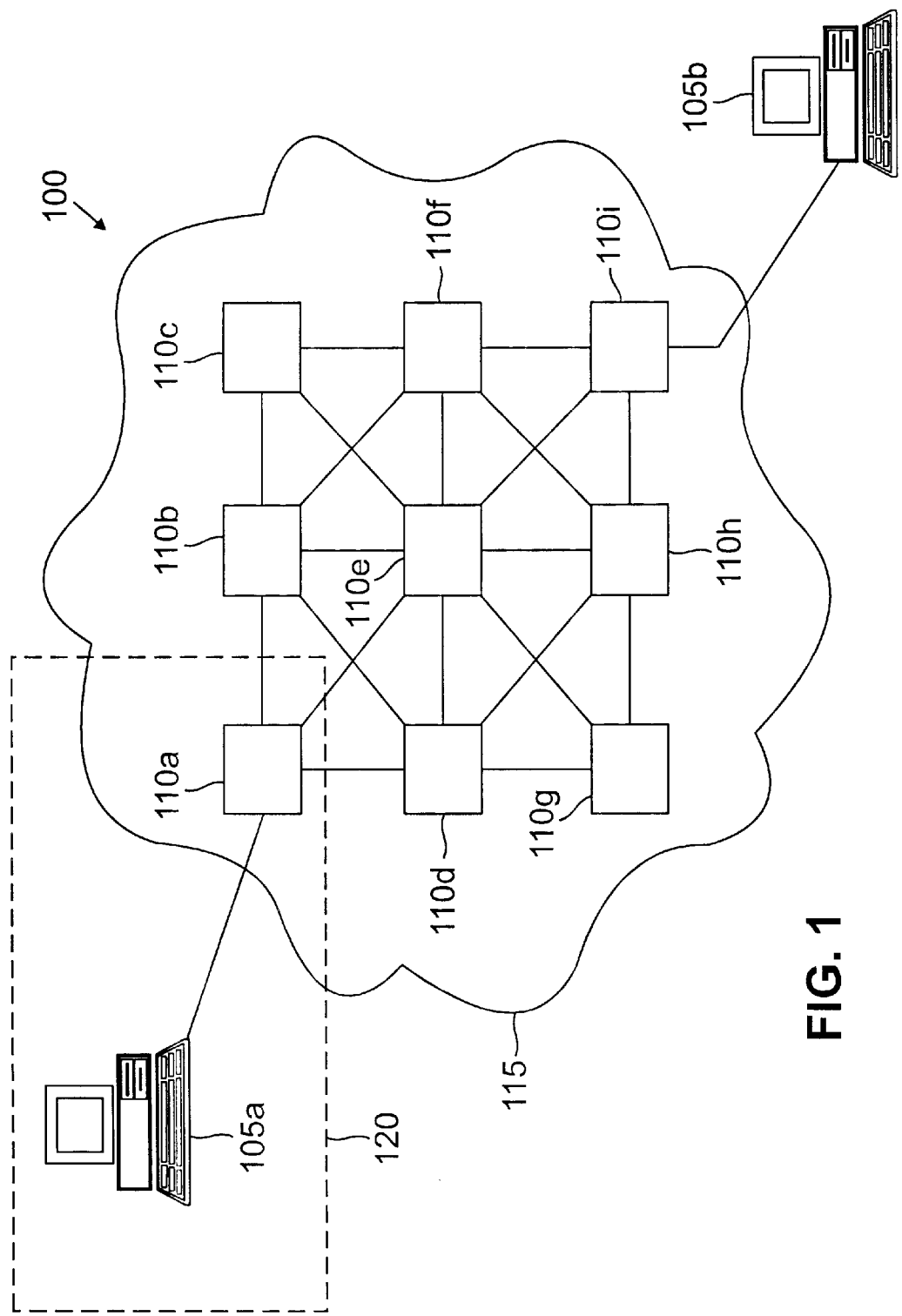
FIG. 1 illustrates a high-level block diagram of an exemplary distributed network with which the principles of the present invention may be suitably used to provide either a central or a peripheral proxy system for allowing users to provide substitute identifiers to server sites of a network to browse anonymously.

Referring initially to FIG. 1, illustrated is a high-level block diagram of an exemplary distributed network (generally designated 100) with which the principles of the present invention may be suitably used to provide either a central or a peripheral proxy system. Distributed network 100 illustratively includes a plurality of computer sites 105 to 110 that are illustratively associated by Internet 115. Internet 115 includes the World Wide Web, which is not a network itself, but rather an "abstraction" maintained on top of Internet 115 by a combination of browsers, server sites, HTML pages and the like.

According to the illustrated embodiment, either proxy system provides substitute identifiers to one or more of a plurality of server sites 110 of network 100. The substitute identifiers allow user sites (and, hence, users (not shown)) to browse the server sites anonymously via the proxy system. Consistent use of the same (site-specific) substitute identifiers at a particular server site personalizes browsing. For purposes of illustration, site 105a is assumed throughout this document to be a user site, site 110a is assumed to be a central proxy site, and site 110g is assumed to be a server site.

Those of skill in the pertinent art will understand that FIG. 1 is illustrative only, in other configurations, any of sites 105 to 110 may be a user, a central proxy or a server site, or a combination of at least two of the same. "Server site," as the term is used herein, is construed broadly, and may include any site capable of being browsed.

Although the illustrated embodiment is suitably implemented for and used over Internet 115, the principles and broad scope of the present invention may be associated with any appropriately arranged computer, communications, multimedia or other network, whether wired or wireless, that has server sites capable of being browsed by users based on identifiers received into the server sites and that are personal to the users. Further, though the principles of the present invention are illustrated using a single user site 105a, a single central proxy site 110a and a single server site 110g, alternate embodiments within the scope of the same may include a plurality of user, central proxy or server sites.

Exemplary network 100 is assumed to include a plurality of insecure communication channels that operate to inter-couple ones of the various sites 105 to 110 of network 100. The concept of communication channels is known and allows insecure communication of information among ones of the intercoupled sites (the Internet employs conventional communication protocols that are also known). A distributed network operating system executes on at least some of sites 105, 110 and may manage the insecure communication of information therebetween. Distributed network operating systems are also known.

According to exemplary central proxy system 110a of the present invention, which is discussed in detail with reference to FIG. 2, substitute identifiers may be suitably indirectly provided by central proxy system 110a to server site 110g (recall that substitute identifiers allow user site 105a to browse server site 110g anonymously). One or more site-specific substitute identifiers are suitably provided or constructed from data specific to user 105a either by user 105a or central proxy system 110a. Central proxy system 110a includes a plurality of executable routines—a first routine processes site-specific substitute identifiers constructed from data specific to user 105a (site-specific substitute identifiers may be suitably constructed by a central proxy site 110a, such as by a routine associated with central proxy system 110a); a second routine transmits the substitute identifiers to server site 110g (possibly via a plurality of intermediate user and server sites 105, 110) and thereafter retransmits browsing commands received from user site 105a to server site 110g; and a third routine removes (and possibly substitutes) portions of the browsing commands that would identify user site 105a to server site 110g (and the plurality of intermediate user and server sites 105, 110). The term "routine," as used herein, is construed broadly to not only include conventional meanings such as program, procedure, object, task, subroutine, function, algorithm, instruction set and the like, but also sequences of instructions, as well as functionally equivalent firmware and hardware implementations.

Figure 5:
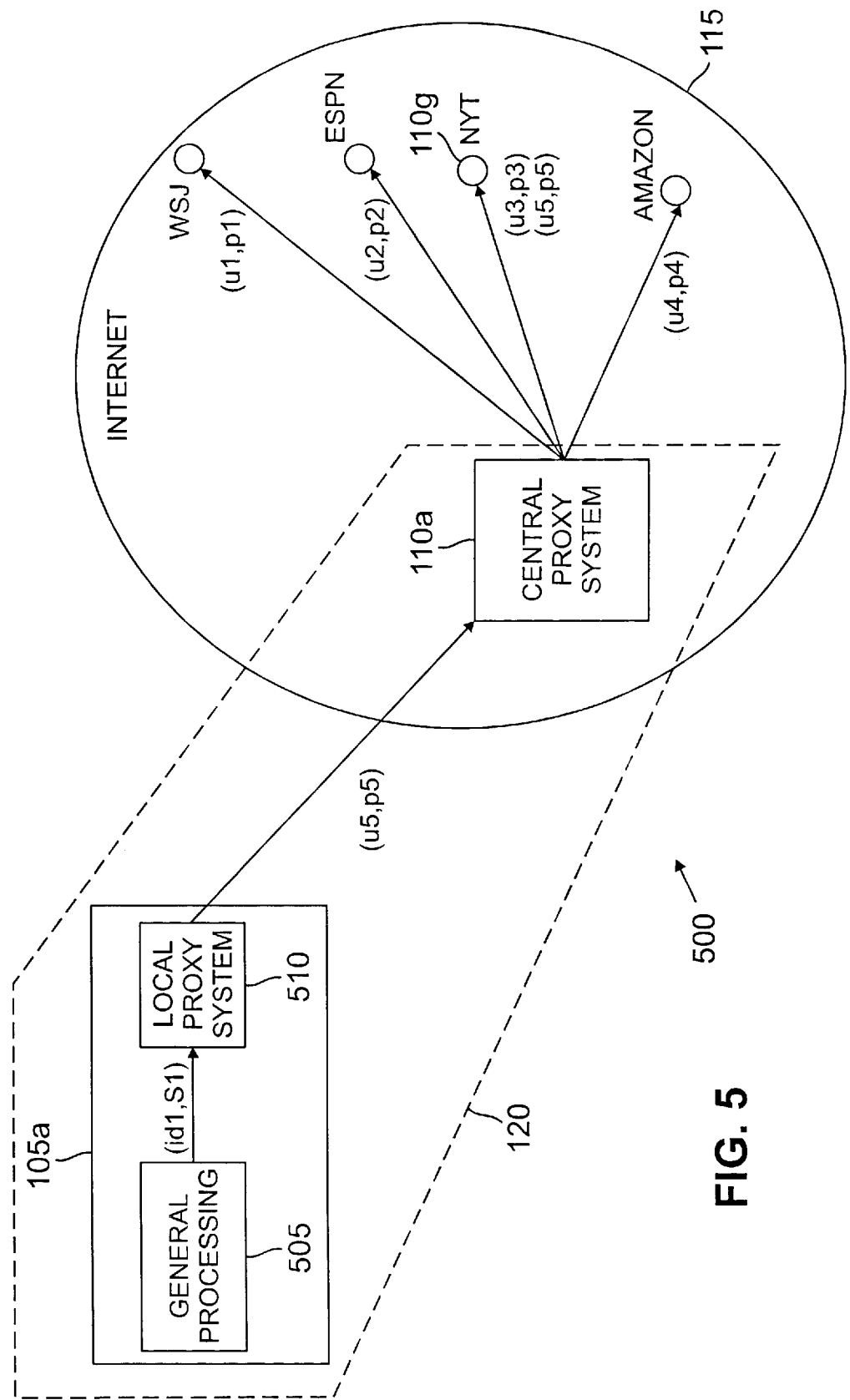
FIG. 5 illustrates a block diagram of an exemplary sub-network of the distributed network of FIG. 1 showing a peripheral proxy system that includes each of a user site, a central proxy system and a plurality of illustrative server site according to the principles of the present invention.

Alternatively, according to an exemplary peripheral proxy system (generally designated 120) of the present invention, which is discussed in detail with reference to FIG. 5, that is designed for use with network 100 again having a server site 110g capable of being browsed by a user site 105a based on substitute identifiers received into server site llog and that are personal to user site 105a. Exemplary peripheral proxy system 120 includes first and second executable routines. The first routine, which may advantageously reside in user site 105a or, alternatively, in central proxy system 110a, constructs a particular substitute identifier from data particular to user site 105a. The second routine, which may also advantageously reside in user site 105a or, partially, in user site 105a and central proxy system 110a, transmits the particular substitute identifier to central proxy system 110a. Central proxy system 110a then retransmits the particular substitute identifier to server site 110g and thereafter communicates (e.g., transmits, receives, etc.) information (e.g., browsing commands, data, etc.) between user site 105a to server site 110g.

According to the illustrated embodiment, peripheral proxy system 120 differs from central proxy system 110a by the location of execution of the first and second routines. In the illustrated central proxy embodiment, all routines are executed by central proxy system 110a, which means that all users must send user specific information to central proxy system 110a. In the illustrated peripheral proxy system 120, the first and second routines may be executed in a proxy subsystem associated with user site 105a. In one advantageous embodiment, user system 105a's user specific information (e.g., user identification, passwords, e-mail addresses, telephone numbers, credit card numbers, postal address, etc.) remain local, which will typically be more secure than central proxy system 110a.

As set forth hereinabove, an ISP, such as NETCOM®, or a networking service, such as AMERICA ONLINE® or COMPUSERVE®, can advantageously employ either exemplary proxy system (central or peripheral) to provide anonymous communication (transmission, reception, retransmission, etc) of browsing (e.g., accessing, selection, reading, etc.) commands between user sites and server sites.

An important aspect of the above-identified embodiments is the use of site-specific substitute identifiers to eliminate the need for a user to have to "invent" a new user name and password for each server site which requires the establishment of an account (e.g., the NEW YORK TIMES, the WALL STREET JOURNAL, the NEWSPAGE® and ESPN® sites). The illustrated embodiment generates secure substitute identifiers (e.g., alias user names, passwords, e-mail addresses, postal addresses, credit card numbers, etc.)

that are distinct and secure for the user. The user provides one or more character strings (which may be random) once, which may advantageously be at the beginning of a proxy system session. The proxy system uses the same to generate one or more secure site-specific substitute identifiers for the user—thereby freeing the user from the burden of inventing new and unique identifiers for each server site. Moreover, the user no longer has to type such secure identifiers every time the user returns to a particular server site requiring an account; instead the proxy system provides the appropriate secure identifiers automatically. In an advantageous embodiment to be described, the proxy system filters other identifying information (e.g., HTTP headers, etc.) sent by user site 105a while browsing server sites. It is important to keep in mind that server sites cannot typically distinguish between information supplied by proxy system 110a and information supplied by user site 105a—central proxy system 110a being transparent to server sites.

In one embodiment, the substitute identifiers are transmitted on demand from servers, without any intervention from the user. This process automates the response to a "basic authentication request," which is a common procedure used by servers to identify users on the World Wide Web. In this way, the user is not burdened by this activity.

According to the illustrated embodiment, to produce substitute identifiers the proxy system may suitably maintain secret information (secret to at least one server-site) in the form of user definable character strings. These character strings may be user defined and may be maintained in some conventional manner, such as storing the same to memory associated with the proxy system, or, advantageously, a function (described hereinafter) may be used to produce the substitute identifiers, at least in part, in association with the secret information. According to one approach, the proxy system maintains a conventional data structure to maintain the same, such as a database, data repository, an array, etc., or even an alias table, that may be used to map user information to their substitute, or alias, identifiers.

According to one advantageous embodiment, the user delivers its own secret (user definable character string) at the beginning of each session, which is used by the proxy system to generate, directly or indirectly, the substitute identifiers for the session. This option has the advantage that a user has the flexibility to choose different proxies at different times and there is no permanent secret information stored on the proxy system. In another related embodiment, the data comprises at least two secret user definable character strings, wherein the first routine processes substitute identifiers constructed in part from the at least two secret user definable character strings. Of course, alternate suitable approaches may be used to accomplish the purpose of providing anonymous personalized web browsing according to the present invention.

Figure 2:
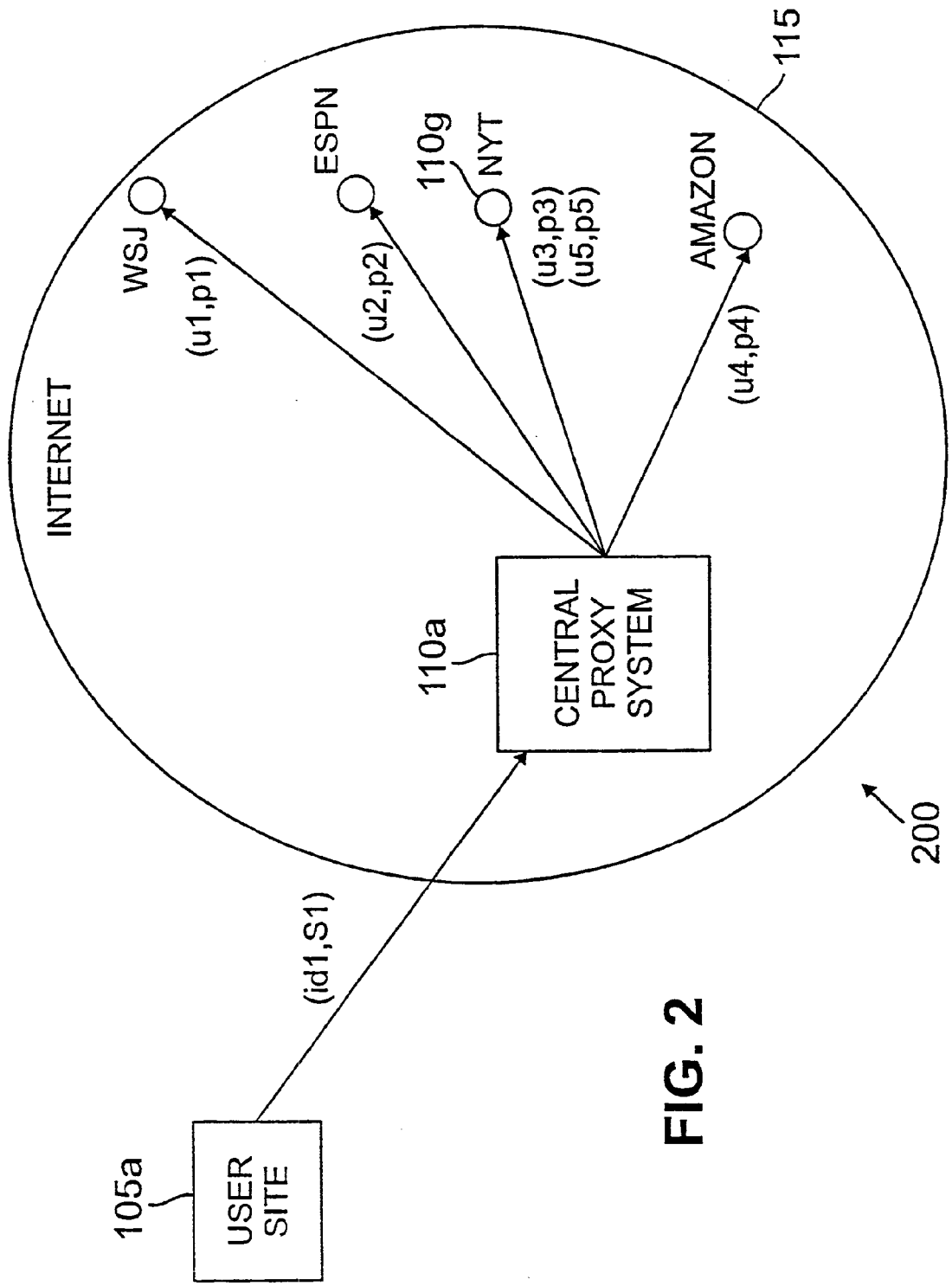
FIG. 2 illustrates a block diagram of an exemplary sub-network of the distributed network of FIG. 1 showing a central proxy system that includes each of a user site, a central proxy system and a plurality of illustrative server sites according to the principles of the present invention.

Turning now to FIG. 2, illustrated is a block diagram of an exemplary sub-network (generally designated 200) of distributed network 100, wherein sub-network 200 includes user site 105a, central proxy system 110a and server site 110g (shown among a plurality of other illustrative server sites 110 of Internet 115) according to the principles of the present invention.

For purposes of illustration, assume that user site 105a issues a command to access server site 110g (the NEW YORK TRIBUE web-site ("NYT")). Such access would be via central proxy system (server site) 110a, which ensures that user specific data concerning user site 105a is not communicated over the remainder of Internet 115—there may be HTTP header fields, for example, that include data about user site 105a that central proxy system 110a filters.

Exemplary central proxy system 110a advantageously executes on a server site that is not associable with user site 105a by other sites over Internet 115. According to an advantageous embodiment, central proxy system 110a may be suitably distant, both physically and logically, from user site 105a—user site 105a does not access server-sites directly because the server-sites can determine both physically and logically the Internet Protocol ("IP")—address of the machine that made the request.

According to the exemplary embodiment, if user site 105a's command to access NYT llog is user site 105a's first request of the current session, central proxy system 110a will recognize the same, and display its own HTML-document, possibly on user site 105a's browser.

Figure 3:
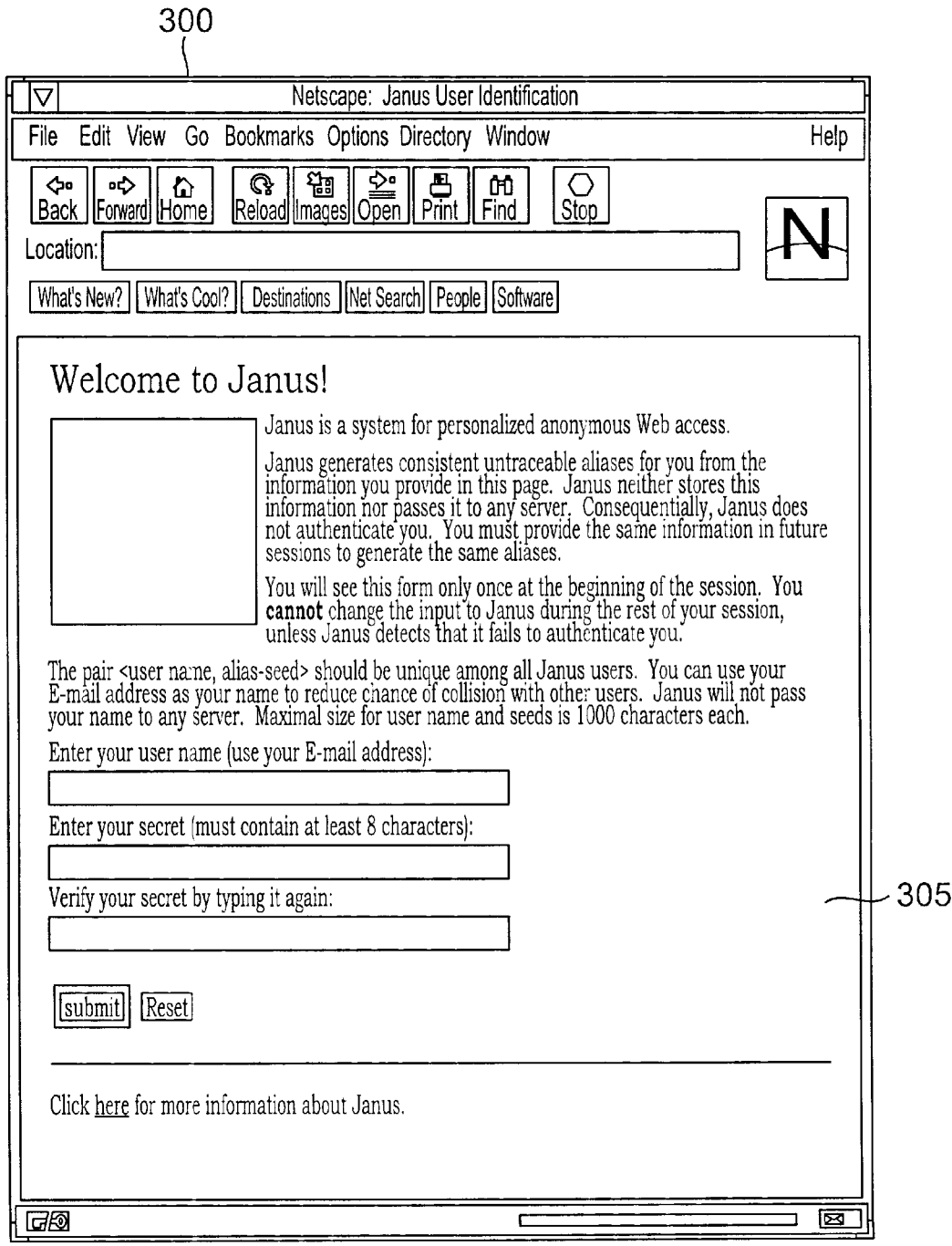
FIG. 3 illustrates an exemplary full screen window of a proxy system according to the principles of the present invention.

Turning momentarily to FIG. 3, illustrated is an exemplary full screen window of a conventional browser 300 ("NETSCAPE®") displaying an inlaid interface 305 ("JANUS$^{SM}$") of central proxy system 110a according to the principles of the present invention. Exemplary interface 305 prompts a user of site 105a to enter user definable character strings, which according to the illustrated embodiment includes identification ("ID") data and secret ("S") data supplied by the user. Each user initially supplies a user ID (e.g., e-mail address) and a user S to allow one or more substitute identifiers to be chosen or constructed (site-specific substitute identifiers are suitably constructed from data specific to user 105a and a particular server site which user 105a intends to browse). Alternatively, other or further data supplied by the user may be appropriate in some applications (e.g., credit card number, post office address, handle, etc.).

According to the advantageous embodiment, substitute identifiers may be constructed (generated) using a suitable function that includes the features of anonymity, consistency, collision resistance and uniqueness, protection from creation of dossiers, and single secret and acceptability. Concerning anonymity, the identity of the user should be kept secret; that is, a server site, or a coalition of sites, cannot determine the true identity of the user from its substitute identification. Concerning consistency, for each server-site, each user should be provided with some substitute identifiers allowing the server site to recognize the user given the same, thereby enabling the server site to personalize the user's access and the user can thus be "registered" at the server site.

With respect to collision resistance and uniqueness, given a user's identity and a server site, a third party should not find a different user identity which results in the same alias (impersonation) for that server site. As to protection from creation of dossiers, the user is likely to be assigned a distinct alias (substitute identifier) for distinct server sites, so that a coalition of sites is unable to learn a user's habits and build a user profile (dossier) based on the set of sites accessed by the user. Lastly, single secret (user definable character string) and acceptability provides, given the user's identity and a single secret, automatic generation of secure, distinct aliases (substitute identifier) as needed for each server-site, transparent to the user—from the user's perspective, the user definable character string is equivalent to a universal password for a collection of server-sites.

According to this embodiment, a user ID is "corrupt" (not secret) if an adversary (one or more server sites desirous of identifying the user), E, has been able to read the user's secret, S. Alternatively, a user ID is "partially opened" (not fully secure) with respect to a particular server site, w, if E has been able to read the alias password; a user ID is "opened" (not secure) with respect to w, if it is partially opened and E has been able to relate the alias password together with the alias user name to the user ID. Assuming that the function, T(), is defined as follows, T(user ID, web-site ("w"), S)=(substitute username, passwords), hence, T(id,w,S)=(Uw,Pw); and Tu(id,w,S)=Uw and Tp(id,w,S)=Pw.

Tu(id,w,S)=Uw=h(enc(k,id,f($s_1$, w))) and

Tp(id,w,S)=Pw=h(enc(k,id,f($s_2$,w))), wherein id denotes user site 105*a*'s ID (e.g., e-mail address);

w denotes server site 110*g*'s domain name;

|| denotes the logical function of concatenation;

S denotes k||$s_1$||$s_2$ a user site 105*a* definable character string;

xor denotes the Boolean function of exclusive or;

f(k,x) denotes a suitably arranged function for generating pseudo-random values, and may be selected from a group of functions, such as des(k,h(x),x);

enc(k,x,r) denotes r||(f(k,r)xor x);

h() denotes a collision-resistant hash function, such as MD5; and des(k,i,x) denotes DES encryption in cipher block chaining ("CBC") mode, which are known, of information x using key k and an initialization vector i.

Both Tu() and Tp() may suitably truncate the result of the hashing function, h(), to fit the longest allowed user name or password for the particular server site.

Relating this function, T(), to the above-identified and described features yields the following:

1. E can only guess at the identity, ID, of a user which is only partially opened and uncorrupted.

2. T() is a deterministic function and E can only guess at the alias-password of a user which is unopened and uncorrupted.

3. Given w and an uncorrupted and unopened user ID, E can only guess at the ID and S.

4. For an uncorrupted user ID and w, T(id,w,S) does not give to E information about T(id,w',S) for any w' not equal to W.

5. The range of T(id,w,S) is such that it is accepted by server sites as a valid username and password—implying a limited length string of printable characters.

Those skilled in the pertinent art will understand that alternate suitable functions may replace or be used in association with the foregoing according to the principles of the present invention.

Use of the foregoing exemplary substitute identifier constructing function, and for that matter, any other suitably arranged function for constructing substitute identifiers according to the present invention, operates to foster the above-identified features of anonymyzed and personalized browsing. The present invention provides the ability to anonymously visit a server site a first time via site-specific substitute identifiers, to interact with the server site as a function thereof, and to re-visit the server site on subsequent occasions using the same site-specific substitute identifiers, interacting with the server site as a return customer— possibly receiving personalized attention—as a function of the recognized substitute identifiers. Simply stated, the substitute identifiers are constructed consistently, and in advantageous embodiments in a site-specific manner.

In one embodiment of the present invention, the substitute identifiers include site-specific substitute user names and site-specific substitute user passwords. "Site-specific" means that the names and passwords vary from site to site, depending perhaps upon the address of each site. This may complicate the task of creating a dossier relative to a given user. In a related embodiment, the first routine constructs site-specific substitute e-mail addresses for user site 105*a* from the site-specific data. In an alternate advantageous embodiment, the first routine constructs the site-specific substitute identifiers from addresses of the server sites—of course, site-specific information other than the address of the site may be used to construct the substitute identifiers.

If this is the first contact of the user with central proxy system 110*a*, then the user may suitably generate a user defined character string (secret) at random and store the same locally. In one advantageous embodiment, the first routine processes substitute identifiers that may be constructed by applying pseudo-random and hash functions (e.g., T() function set forth hereinabove) to the data received from user site 105*a*—those skilled in the art are familiar with the structure and operation of pseudo-random and hash functions and their utility. The important aspect of this and related embodiments is that the present invention is adapted to take advantage of current and later-discovered functions to enhance anonymity and security.

Alternatively, if this is the first contact of a current session then the user may suitably enclose the stored user defined character string to central proxy system 110*a*. Nonetheless, browser 300 sends interface 305 together with a user's ID and other user definable character string to central proxy system 110*a*. Central proxy system 110*a* receives this information and may use the same for the rest of the session.

In one advantageous embodiment, the first routine receives or generates session tags that are added to the browsing commands, central proxy site 110*a* employing the session tags to associate the substitute identifiers with each of the browsing commands—the session tags, while not necessary to the present invention, provide one manner that allows user sites 105*a* to supply their data only once, usually at the beginning of each session. In a related advantageous embodiment, central proxy site 110*a* includes a data store that is capable of containing session information specific to user sites 105*a* and accessible by server sites 110*g*.

In one advantageous embodiment, the second routine described above, which may be local to the central proxy system 110*a,* transmits the substitute identifiers to server site 110*g*. In a further advantageous embodiment, the second routine transmits the substitute identifiers to server site 110*g* based on alphanumeric codes supplied in fields of web-pages 305 by the users. The alphanumeric codes prompt the second routine as to how and where to locate the substitute identifiers, removing the users from actually having to provide the substitute identifiers directly. Of course, the alphanumeric codes may be supplied in a different form. In a related, more specific embodiment, the users manually place the alphanumeric codes in the fields of web-pages 305. Of course, the present invention encompasses intelligent parsing of the fields of web pages 305 to determine automatically how and where the alphanumeric codes should be located. Those skilled in the art are familiar with the Internet in general, the World Wide Web in particular and the way in which the structure of the World Wide Web promotes "browsing." The present invention finds apparent utility in conjunction with the Internet and the World Wide Web, however, those skilled in the art will readily understand that the present invention has advantageous application outside of the Internet as well in any suitably arranged computer, communications, multimedia or like network configuration.

Nonetheless, after central proxy system 110*a* obtains the required information about the user, the above-described third routine removes portions of the browsing commands that would identify user site 105a to server site 110g, and forwards user site 105a's original request for access to NYT-site 110g (e.g., using an HTTP get-request)—thereby selectively excluding from the request header-fields or the like that may identify the user.

Figure 4:
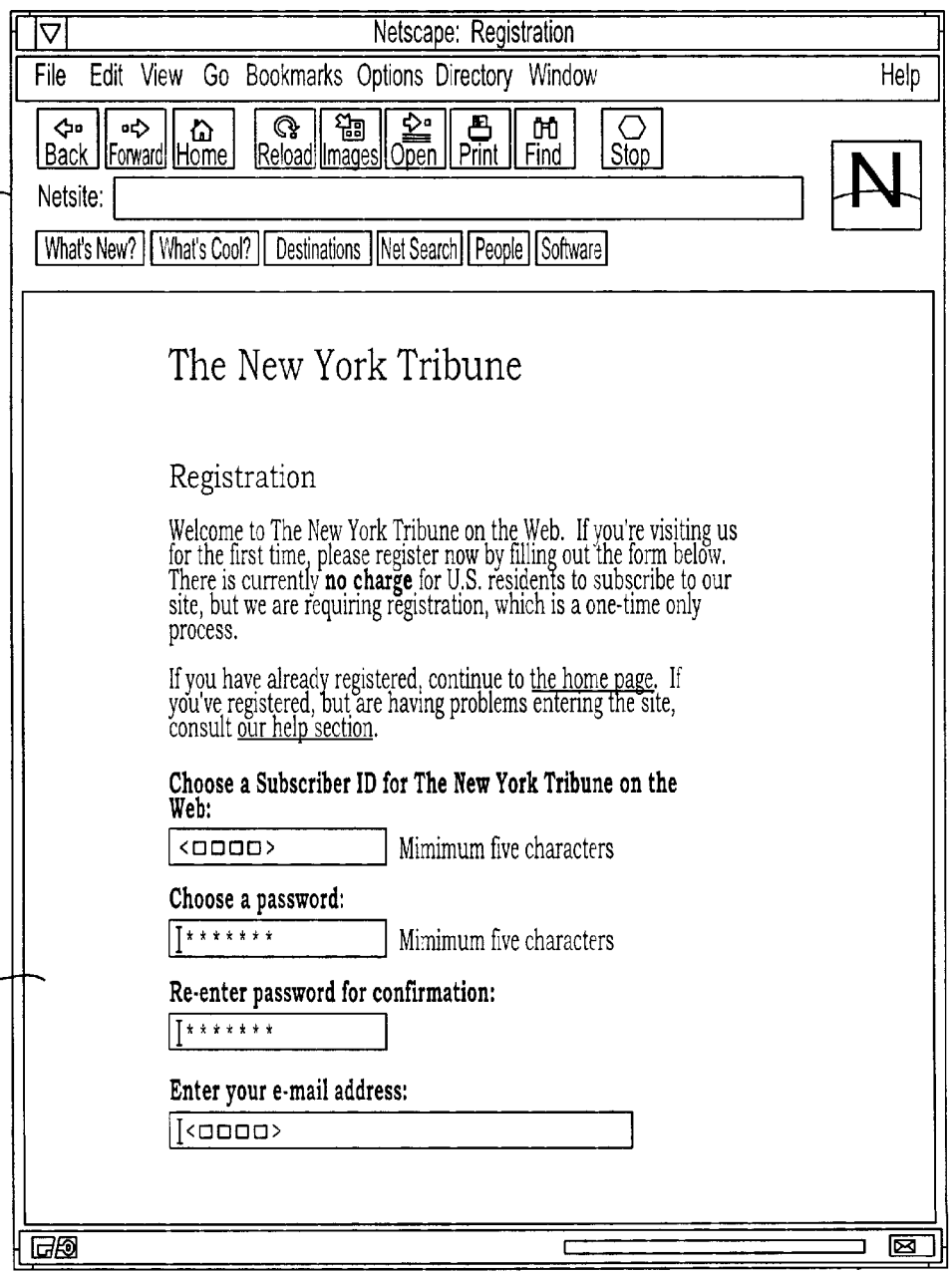
FIG. 4 illustrates an exemplary full screen window of an interface of a particular server site according to the principles of the present invention.

If this is the user's first visit to NYT-site 110g, then it may suitably provide the user with an electronic form prompting, for example, for a user name, a password and an e-mail address in order to establish an account. Turning momentarily to FIG. 4, illustrated is exemplary full screen window of conventional NETSCAPE® browser 300 displaying an inlaid interface 400 ("THE NEW YORK TRIBUNE") of server site 110g according to the principles of the present invention.

Now, instead of having to provide a unique user name and a secret password, the user may suitably provide these fields with simple escape strings (e.g., "<uuuu>" and "<pppp>"). More specifically, the alphanumeric codes above-described may be suitably arranged into such escape sequences—those skilled in the art are familiar with escape sequences. These strings are recognized by central proxy site 110a which uses user site 105a's user name and secret (user definable character string) along with the domain-name of the NEW YORK TRIBUNE and computes substitute identifiers (e.g., alias user name, u3, and alias password, p3, in FIG. 2, etc.), such as by function T(ID, secret, domain-name). The site-specific substitute identifiers may be sent to a particular server site by central proxy system 110a using the same mechanism that the user would submit input to the particular server site. In other words, proxy system 110a receives information communications, such as browsing commands, from user site 105a intended for server site 110g, and retransmits the same to server site 110g—central proxy system 110a functioning as a transparent conduit for anonymizing and, through consistent generation of site-specific substitute identifiers, personalizing server site browsing.

On a subsequent visit to NYT-site 110g, which will require that user site 105a authenticate itself (response to the first get-request forwarded to NYT-site 110g by central proxy system 110a), central proxy system 110a may be suitably operative to automatically recompute u3 and p3 and reply by sending these values back to NYT-site 110g (re-sending the get-request). User site 105a is thereby freed from the burden of remembering the user name and password of its NYT-site 110g account. To summarize, the protocol, which may be suitably executed without involving user site 105a, includes: (1) a step of NYT-site server 110g requesting an authentication from central proxy site 110a by failing the first get request; (2) central proxy site 110a recomputing the substitute identifiers (e.g., (alias-user name, alias-password)=T(ID, secret, domain-name), or the like); (3) central proxy site 110a replying by re-sending the get with the same substitute identifiers.

The substitute identifiers are consistent in the sense that the substitute identifiers are presented on subsequent visits to the same server site by user 105a. Consistent substitute identifiers allow server sites to recognize returning users and provide personalized service to them. In one embodiment, the second routine transmits the substitute identifiers on demand from servers, without any intervention from user 105a. This process automates the response to a "basic authentication request," which is a common procedure used by servers to identify users 105a on the World Wide Web. In this way, user 105a is not burdened by this activity. In this embodiment, the second routine may have to re-transmit the original user request along with the substitute identifier to the server.

It should be noted that many servers require a valid e-mail address for creating an account—users cannot use their true e-mail address for this purpose since it uniquely identifies them. The proxy system of the present invention may suitably solve this problem by creating an alias e-mail address for user site 105a and store e-mail in an electronic mailbox. In one advantageous embodiment central proxy system 110a includes a data store capable of containing e-mail destined for the users, thereby preventing server sites from contacting users directly. Contrary to prior art anonymous re-mailers, the present embodiment is not required to rely on having to store any translation tables (which may be large and vulnerable) from alias to true user identifiers in central proxy system 110a. This embodiment is inherently securer than prior art approaches as central proxy system 110a is not required to maintain and protect a translation table and cannot be forced to reveal the contents of any such table to a third party.

In an alternate advantageous embodiment, central proxy system 105a further includes a data store capable of containing e-mailboxes for the users and specific to the server sites. According to this embodiment, each user has a mailbox for each site that has generated mail destined for the user. Rather than compromising security by allowing automatic remailing to the user, the present embodiment may store e-mail for explicit retrieval by each user.

For each server, it may be advantageous for users to have a separate e-mail box, possibly identified by user-substitute identifiers. This approach may allow for suitable disposal of e-mail messages received from the third-parties (e.g., "junk e-mail") as well as the option of selective disposal of e-mail messages.

In one advantageous embodiment, each of e-mailboxes has a key associated therewith, the key being a function of the data and an index number. The use of keys with e-mailboxes is known. In another advantageous embodiment, central proxy system 110a further comprises a computer-executable routine that, given the substitute identifiers, collects e-mail destined for the users and contained within a plurality of site-specific e-mailboxes. This embodiment may suitably employ a mail-collecting routine that automatically locates user site 105a's various mailboxes and retrieves the mail therefrom once the user has supplied the appropriate data.

According to one advantageous embodiment, central proxy system 110a includes functionality necessary to support electronic payment, the users employ electronic payment information to engage in anonymous commerce with the server sites. To facilitate the same, central proxy system 110a may include a data store capable of containing such electronic payment information. Further, substitute identifiers may be constructed, at least in part, using credit/debit card numbers, bank branch or account numbers, postal addresses, telephone numbers, tax identification numbers, social security numbers or the like. Various methods for achieving anonymous commerce are known.

By way of further example, an ever increasing number of sites require a valid credit card number as part of establishing an account, so that such sites may charge the user for their services (e.g., WALL STEET JOURNAL®, ESPN®, etc.). While the above-described proxy system provides substitute identifiers to free users from remembering these items and by providing a guard on (involuntary) data flowing to the web-site, it may not provide complete anonymity to a user who has provided a credit card number to a site. One solution, described briefly above, requires central proxy system 110a to provide its own valid credit card number to the requesting site and then collect money from its users. If central proxy system 105a is incorporated into an Internet provider, for example, such as AMERICA ONLINE®, then this relationship may already exist.

Alternatively, central proxy system 110a may be known and trusted by other sites, thereby allowing central proxy system 110a to generate an alias credit card number and expiration date, and then to authenticate this data and send it to a requesting site. The site can then check that this number indeed originates from central proxy system 110a and hence accepts the same as valid, with the understanding that it can collect the money from central proxy system 110a. There no longer is a need to send a "real" credit card number between central proxy system 110a and the sites.

It is important to realize that the various features and aspects of the embodiments above-described may also be suitably implemented in accordance with the peripheral proxy system described with reference to FIG. 1. More particularly, turning momentarily to FIG. 5, there is illustrated a block diagram of an exemplary sub-network (generally designated 500) of the distributed network of FIG. 1 showing a peripheral proxy system 120 that includes each of user site 105a, central proxy system 110a and NYT-site 110g (shown among a plurality of other illustrative server sites 110 of Internet 115) according to the principles of the present invention.

Peripheral proxy system 120, as set forth above, includes first and second executable routines. The first routine, which advantageously resides in user site 105a, constructs substitute identifiers from data particular to user site 105a. The second routine, which also illustratively resides in user site 105a, transmits the substitute identifiers to central proxy system 110a. Central proxy system 110a then retransmits the substitute identifiers to server site 110g and thereafter communicates (e.g., transmits, receives, etc.) information (e.g., browsing commands, data, etc.) between user site 105a to server site 110g. This second configuration is particularly advantageous when users may not trust central proxy system 110a or the communication lines therebetween, and want to keep user identifications and other secret information secure.

A local proxy system 510 may be used to maintain the same, and may use the user's identification and other information to compute the substitute identifiers. Local proxy system 510 communicates with a central proxy system 110a, which may be used to forward communication to servers and handle e-mail. In one embodiment, central proxy system 110a communicates with computer-executable local routines associated with the users, the local routines constructing the site-specific substitute identifiers from data specific to the users. Again, central proxy system 110a may rely on distributed routines, local to each user, that generate the substitute identifiers and transmit the same to central proxy system 110a.

Figure 6:
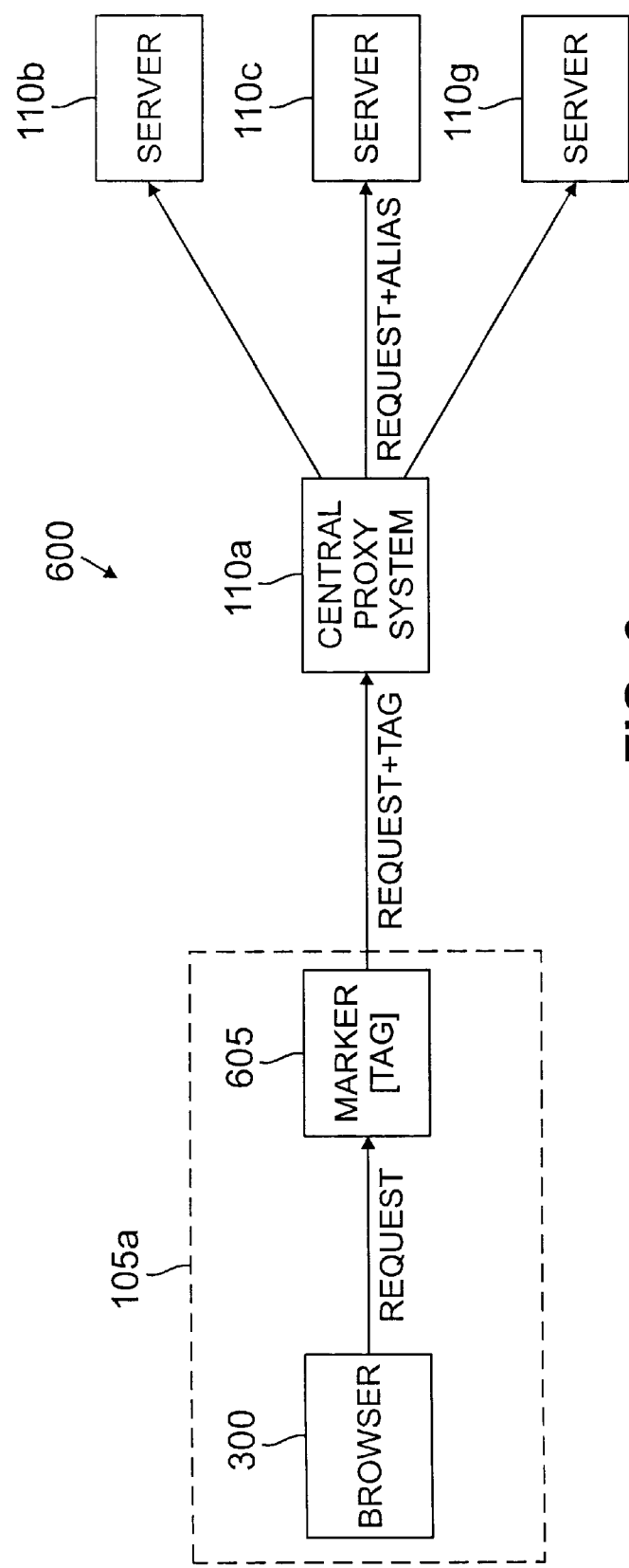
FIG. 6 illustrates a block diagram of an exemplary sub-network of the distributed network of FIG. 1 including each of a user site, a central proxy system and a plurality of illustrative server sites according to an exemplary marker proxy embodiment of the present invention.

Turning now to FIG. 6, illustrated is a block diagram of an exemplary sub-network (generally designated 600) of the distributed network 100 including each of user site 105a, central proxy system 110a and a plurality of illustrative server sites 110b, 110c, and 110g according to an exemplary marker proxy embodiment of the present invention. As described above, the central proxy system of the present invention may be employed in at least two configurations, namely, a central proxy configuration (FIG. 2) or a peripheral proxy configuration (FIG. 5).

In the central proxy configuration, central proxy system 110a computes substitute identifiers. An implementation of this configuration may require user site 105a to provide one or more user definable character strings (e.g., user identification, password and other secret information) once, and central proxy system 110a will thereafter generate the substitute identifiers as needed. Central proxy system 110a may associate the user definable character strings with a series of HTTP requests generated by the same user site 105a—the central proxy system 110a may associate each request with a session, that contains all communication between a specific user site 105a and the central proxy system 110a.

The HTTP protocol however does not generally directly support sessions or relationships between requests. More particularly, each HTTP request may be sent a new socket connection, and there is no required HTTP header field that can link successive requests from the same user.

It should be noted that the session identification is typically not necessary in the peripheral proxy configuration since central proxy system 110a may forward communications without any computation. In a typical embodiment, peripheral proxy system 120 retransmits browsing commands received from user site 105a to central proxy system 110a, which then retransmits such commands to server site 110g. According to one embodiment, peripheral proxy system 120 removes and, possibly, substitutes portions of the browsing commands that would identify user site 105a to server site 110g.

In one advantageous embodiment user site 105a runs a marker program 605 locally. Marker program 605 operates to tag user site 105a's requests with a session tag, t. Central proxy system 110a uses this tag to identify requests belonging to a particular one of a group of users. Marker program 605 may be implemented to store user site 105a's session tag and add this tag to all requests, and central proxy system 110a removes the session tag before forwarding the request to some server site. The session tag should be unique, as no two users should have the same tag.

It should be noted that NETSCAPE® uses "cookies," which are a mechanism for storing and retrieving long term session information (the use of "cookies" conceptually is known). The cookies are generated by the browsed servers and are associated with a specific domain name. Browsers 300 submit the cookies associated with a specific domain name whenever the user re-visits that domain. Servers typically only generate cookies associated with their domain. Cookies provide an easy mechanism to keep session information, such as the contents of a "shopping cart," account name, password, event counters, user preferences, etc.

Some companies, use cookies extensively to track users and their habits. Since the proxy systems of the present invention present substitute identifiers to browsed servers, the servers cannot learn true user identities. Thus all of the information that the server may store in its cookie relates to some "alias persona," and not to the true user. Whenever the user returns to the same server, it will present the same substitute identifiers, and may also submit the cookie that the server generated earlier for this alias persona.

It is apparent from above, that the present invention provides, for use with a network having user sites and server sites, wherein the server sites are capable of being browsed by the user sites based on identifiers received into the server sites and personal to the user sites, both a central and a peripheral proxy system for providing consistent substitute identifiers to the server sites that allow the user sites to browse the server sites in an anonymous and personal fashion via the proxy system.

An exemplary central proxy system includes: (1) an executable first routine that processes site-specific substitute identifiers constructed from data specific to the user sites, (2) an executable second routine that transmits the substitute identifiers to the server sites and thereafter retransmits browsing commands received from the user sites to the server sites and (3) an executable third routine that removes (and possibly substitutes) portions of the browsing commands that would identify the user sites to the server sites.

An exemplary peripheral proxy system includes: (1) an executable first routine that constructs a particular substitute identifier from data received from a particular user site and (2) an executable second routine that transmits the particular substitute identifier to a central proxy system, the central proxy system then retransmitting the particular substitute identifier to the server site and thereafter retransmitting browsing commands received from the particular user site to the server site.

Although the present invention has been described in detail, those skilled in the art should understand that they can make various changes, substitutions and alterations herein without departing from the spirit and scope of the invention in its broadest form. More particularly, it should be apparent to those skilled in the pertinent art that the above-described routines are software-based and executable by a suitable conventional computer system/network. Alternate embodiments of the present invention may also be suitably implemented, at least in part, in firmware or hardware, or some suitable combination of at least two of the three. Such firmware- or hardware embodiments may include multi, parallel and distributed processing environments or configurations, as well as alternate programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like—to form the various types of modules, circuitry, controllers, routines and systems described and claimed herein.

Conventional computer system architecture is more fully discussed in *The Indispensable PC Hardware Book,* by Hans-Peter Messmer, Addison Wesley (2nd ed. 1995) and *Computer Organization and Architecture,* by William Stallings, MacMillan Publishing Co. (3rd ed. 1993); conventional computer, or communications, network design is more fully discussed in *Data Network Design,* by Darren L. Spohn, McGraw-Hill, Inc. (1993); and conventional data communications is more fully discussed in *Voice and Data Communications Handbook,* by Bud Bates and Donald Gregory, McGraw-Hill, Inc. (1996), *Data Communications Principles,* by R. D. Gitlin, J. F. Hayes and S. B. Weinstein, Plenum Press (1992) and *The Irwin Handbook of Telecommunications,* by James Harry Green, Irwin Professional Publishing (2nd ed. 1992). Each of the foregoing publications is incorporated herein by reference for all purposes.

What is claimed is:

1. A central proxy system for coupling to a network and for allowing users to browse server sites on said network anonymously via said central proxy system, said central proxy system comprising:

a computer-executable first routine that processes site-specific substitute identifiers constructed from non-masked data specific to said users, such that said server sites are unable to determine an identity of said user;

a computer-executable second routine that transmits said substitute identifiers to said server sites and thereafter retransmits browsing commands received from said users to said server sites; and a computer-executable third routine that removes portions of said browsing commands that would identify said users to said server sites.

2. The central proxy system as recited in claim 1 wherein said data comprises identification data and a user definable character string supplied by said users.

3. The central proxy system as recited in claim 1 wherein said site-specific substitute identifiers comprise site-specific substitute user names and site-specific substitute user passwords.

4. The central proxy system as recited in claim 1 wherein said first routine constructs site-specific substitute electronic mail addresses for said users from said data.

5. The central proxy system as recited in claim 1 wherein said first routine constructs said site-specific substitute identifiers from addresses of said server sites.

6. The central proxy system as recited in claim 1 wherein said server sites are World Wide Web sites capable of presenting web pages to said users, said second routine transmitting said substitute identifiers to said server sites under direction of said users.

7. The central proxy system as recited in claim 1 wherein said second routine transmits said substitute identifiers to said server sites based on alphanumeric codes supplied in web page fields by said users.

8. The central proxy system as recited in claim 7 wherein said alphanumeric codes are arranged in escape sequences.

9. The central proxy system as recited in claim 7 wherein said users manually place said alphanumeric codes in said web page fields.

10. The central proxy system as recited in claim 9 wherein said central proxy system communicates with computer-executable local routines associated with said users, said local routines constructing said site-specific substitute identifiers from data specific to said users.

11. The central proxy system as recited in claim 1 further comprising a data store capable of containing electronic mail destined for said users.

12. The central proxy system as recited in claim 1 wherein said first routine processes substitute identifiers constructed by applying pseudo-random and hash functions to said data received from said users.

13. The central proxy system as recited in claim 1 further comprising a data store capable of containing electronic mailboxes for said users and specific to said server sites.

14. The central proxy system as recited in claim 13 wherein each of said electronic mailboxes has a key associated therewith, said key being a function of said data and an index number.

15. The central proxy system as recited in claim 1 further comprising a computer-executable routine that, given said substitute identifiers, collects electronic mail destined for said users and contained within a plurality of site-specific electronic mailboxes.

16. The central proxy system as recited in claim 1 wherein said first routine receives session tags added to said browsing commands, said central proxy system employing said session tags to associate said substitute identifiers with each of said browsing commands.

17. The central proxy system as recited in claim 1 further comprising a data store capable of containing session information specific to said users and accessible by said server sites.

18. The central proxy system as recited in claim 1 further comprising a data store capable of containing electronic payment information, said users employing said electronic payment information to engage in anonymous commerce with said server sites.

19. The central proxy system as recited in claim 1 further comprising an initializing routine that constructs said site-specific substitute identifiers from data specific to said users and communicates said site-specific substitute identifiers to said first routine.

20. A peripheral proxy system for coupling to a network and for allowing at least one user to browse a server site on said network anonymously via a central proxy system, said peripheral proxy system comprising:

a computer-executable first routine that constructs a particular substitute identifier from non-masked data received from a particular user, such that said server site is unable to determine an identity of said user; and a computer-executable second routine that transmits said particular substitute identifier to said central proxy system, said central proxy system retransmitting said particular substitute identifier to said server site and thereafter retransmitting browsing commands received from said particular user to said server site.

21. The peripheral proxy system as recited in claim 20 wherein said data comprises identification data and a user definable character string supplied by said particular user.

22. The peripheral proxy system as recited in claim 20 wherein said particular substitute identifier comprises a particular substitute user name and a particular substitute user password.

23. The peripheral proxy system as recited in claim 20 wherein said first routine constructs a particular substitute electronic mail address for said particular user from said data.

24. The peripheral proxy system as recited in claim 20 wherein said first routine constructs said particular substitute identifier from an address of said server site, said particular substitute identifier therefore being specific to said server site.

25. The peripheral proxy system as recited in claim 20 wherein said server site is a World Wide Web site capable of presenting at least one web page to said users, said central proxy system transmitting said particular substitute identifier to said server site under direction of said particular user.

26. The peripheral proxy system as recited in claim 20 wherein said central proxy system said particular substitute identifier to said server site based on alphanumeric codes supplied in web page fields by said user.

27. The peripheral proxy system as recited in claim 26 wherein said alphanumeric codes are arranged in escape sequences.

28. The peripheral proxy system as recited in claim 20 wherein said central proxy system further comprises a computer-executable third routine that removes portions of said browsing commands that would identify said particular user to said server site.

29. The peripheral proxy system as recited in claim 28 wherein said first and second routines are executable on a computer system associated with said particular user and said central proxy system is a computer system having a network address different from said computer system associated with said particular user.

30. The peripheral proxy system as recited in claim 20 wherein said central proxy system further comprises a data store capable of containing electronic mail destined for said particular user.

31. The peripheral proxy system as recited in claim 20 wherein said first routine constructs said particular substitute identifier by applying pseudo-random and hash functions to said data received from said particular user.

32. The peripheral proxy system as recited in claim 20 wherein said central proxy system further comprises a data store capable of containing an electronic mailbox for said particular user and specific to said server site.

33. The peripheral proxy system as recited in claim 32 wherein said electronic mailbox has a key associated therewith, said key being a function of said data and an index number.

34. The peripheral proxy system as recited in claim 20 wherein said central proxy system further comprises a computer-executable routine that, given said particular substitute identifier, collects electronic mail destined for said particular user and contained within at least two electronic mailboxes.

35. The peripheral proxy system as recited in claim 20 wherein said central proxy system further comprises a computer-executable marker routine that adds session tags to said browsing commands, said proxy system employing said session tags to associate said particular substitute identifier with each of said browsing commands.

36. The peripheral proxy system as recited in claim 20 wherein said central proxy system further comprises a data store capable of containing session information specific to said particular user and accessible by said server site.

37. The peripheral proxy system as recited in claim 20 wherein said central proxy system further comprises a data store capable of containing electronic payment information, said particular user employing said electronic payment information to engage in anonymous commerce with said server site.

38. A method for use with a network having a server site capable of being browsed by users and for allowing said users to browse said server site on said network anonymously via said proxy system, said method comprising the steps of:

constructing a particular substitute identifier from non-masked data received from a particular user, such that said server site is unable to determine an identity of said user;

transmitting said particular substitute identifier to said server site; and thereafter retransmitting browsing commands received from said particular user to said server site.

39. The method as recited in claim 38 wherein said data comprises identification data and a user definable character string supplied by said particular user.

40. The method as recited in claim 38 wherein said particular substitute identifier comprises a particular substitute user name and a particular substitute user password.

41. The method as recited in claim 38 further comprising the step of constructing a particular substitute electronic mail address for said particular user from said data.

42. The method as recited in claim 38 wherein said step of constructing comprises the step of constructing said particular substitute identifier from an address of said server site, said particular substitute identifier therefore being specific to said server site.

43. The method as recited in claim 38 wherein said server site is a World Wide Web site capable of presenting at least one web page to said users, said method further comprising the step of transmitting said particular substitute identifier to said server site under direction of said particular user.

44. The method as recited in claim 38 wherein said step of transmitting comprises the step of transmitting said particular substitute identifier to said server site based on alphanumeric codes supplied in web page fields by said user.

45. The method as recited in claim 44 wherein said alphanumeric codes are arranged in escape sequences.

46. The method as recited in claim 38 further comprising the step of removing portions of said browsing commands that would identify said particular user to said server site.

47. The method as recited in claim 46 wherein said step of constructing is performed on a computer system associated with said particular user and said steps of transmitting and thereafter transmitting are performed on a computer system having a network address different from said computer system associated with said particular user.

48. The method as recited in claim 38 further comprising the step of storing electronic mail destined for said particular user.

49. The method as recited in claim 38 wherein said step of constructing comprises the step of applying pseudo-random and hash functions to said data received from said particular user.

50. The method as recited in claim 38 further comprising the step of creating an electronic mailbox for said particular user and specific to said server site.

51. The method as recited in claim 50 wherein said electronic mailbox has a key associated therewith, said key being a function of said data and an index number.

52. The method as recited in claim 38 further comprising the step of collecting electronic mail destined for said particular user and contained within at least two electronic mailboxes given said particular substitute identifier.

53. The method as recited in claim 38 further comprising the step of adding session tags to said browsing commands, said proxy system employing said session tags to associate said particular substitute identifier with each of said browsing commands.

54. The method as recited in claim 38 further comprising the step of storing session information specific to said particular user and accessible by said server site.

55. The method as recited in claim 38 further comprising the step of storing electronic payment information, said particular user employing said electronic payment information to engage in anonymous commerce with said server site.

* * * * *